Figures 1, 2:
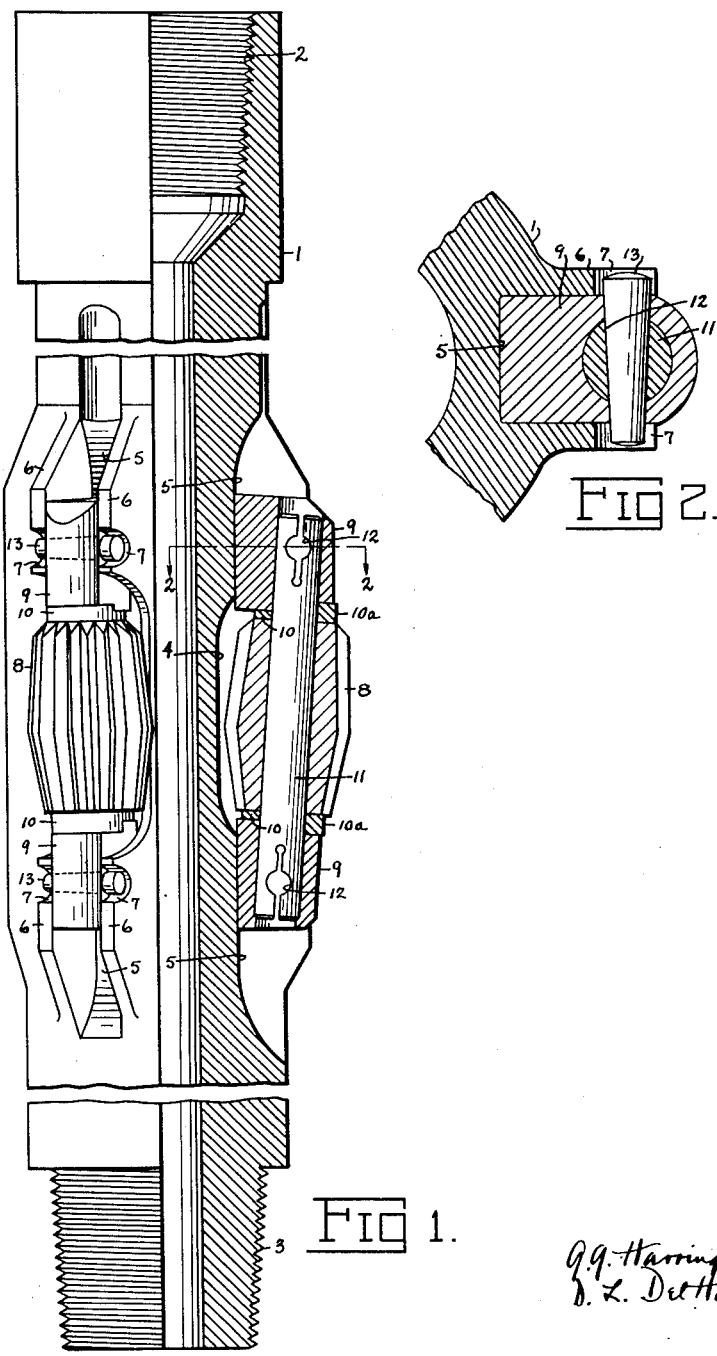

Dec. 19, 1933.  G. G. HARRINGTON ET AL  1,940,415
DRILL
Filed Dec. 6, 1932

G. G. Harrington
D. L. DelHomme
INVENTORS

BY J. Vincent Martin
ATTORNEY.

Patented Dec. 19, 1933

1,940,415

UNITED STATES PATENT OFFICE 1,940,415

DRILL

George G. Harrington, Houston, Tex., and Daniel L. Del Homme, Oklahoma City, Okla., assignors to Reed Roller Bit Company, Houston, Tex., a corporation of Texas Application December 6, 1932. Serial No. 645,898

5 Claims. (Cl. 255—73)

This invention relates generally to drills and specifically to deep well drills.

It is customary to mount a roller cutter in the body of a bit or reamer of a drill by means of a removable pin on which the cutter is rotatable. The pin is usually locked in the body by set screws and the like and the removal of the pin is at times a quite difficult task.

This invention has for its specific object the provision of a drill embodying new and improved means to rigidly lock a cutter pin in the body of the drill so that it may be removed quickly and easily.

The preferred embodiment of the invention is illustrated by the accompanying drawing, wherein Fig. 1 is a partly sectional side elevation of a reamer body with cutters mounted therein; and Fig. 2, a detail view taken on the line 2—2 of Fig. 1.

In the drawing the body is indicated at 1. It has threads 2 and 3 whereby it may be connected to the adjacent sections of the drill stem not shown. A plurality of cutters are mounted in the body as follows:

In the body is a cutter recess 4 and at opposite ends of the cutter recess 4 are block recesses 5. Projecting laterally from opposite sides of the block recesses 5 are supporting flanges 6 having therein grooves 7.

In the cutter recess 4 is a cutter 8 and in the block recesses 5 are blocks 9. Between the cutter 8 and blocks 9 are washers 10, having enlarged outer portions 10—a which the blocks 9 are shaped to fit. Extending through the cutter 8 and washers 10—a and into the blocks 9 is a cutter pin 11, each end of which is split as indicated at 12. The cutter pin 11 is locked in the blocks 9 by tapered locking pins 13 that may be inserted through the grooves 7 in the flanges 6 and through the blocks 9 and the ends of the pin 11 to spread the ends of the pin into locking engagement with the blocks. The blocks 9 may be welded in the recesses 5 as desired.

It will be apparent from the foregoing that the cutter by the new and improved means described may be quickly and easily mounted in and removed from the head. To effect the removal of the cutter, it is necessary only to strike the pins 13 a blow to knock them out of the pin and blocks, whereupon the cutter pin 11 may be removed upwardly. When the outer portion of the cutter pin 11 becomes worn it may be rotated on its axis through 180° to present the unworn portion thereof outwardly and the pins 13 may then be reinserted.

We claim:—

1. A drill having a body, said body having therein a cutter recess, a pair of block recesses at the opposite ends of said cutter recess, and flanges projecting laterally from opposite sides of said block recesses, said flanges having grooves therein; a block in each of said block recesses and between said flanges; a roller cutter in said cutter recess; a cutter pin in said blocks and cutter; washers on said pin between said cutter and said blocks, said washers having enlarged outer portions and said blocks being shaped to fit said washers to hold said washers non-rotatably on said cutter pin; the ends of said cutter being longitudinally split; and tapered locking pins movable through the grooves in said flanges, through said blocks, and through the ends of said cutter pin to spread the ends of said cutter pin into locking engagement with said blocks; said parts being so constructed that said cutter pin may be locked in two positions on the same axis by said locking pins, one of said positions being 180° from the other of said positions.

2. A drill having a body, said body having therein a cutter recess, a pair of block recesses at the opposite ends of said cutter recess, and flanges projecting laterally from opposite sides of said block recesses, said flanges having grooves therein; a block in each of said block recesses; a roller cutter in said cutter recess; a cutter pin in said blocks and cutter; the ends of said cutter pin being longitudinally split; and tapered locking pins movable through the grooves in said flanges, through said blocks, and through the ends of said cutter pin to spread the ends of said cutter pin into locking engagement with said blocks; said parts being so constructed that said cutter pin may be locked in two positions on the same axis by said locking pins, one of said positions being 180° from the other of said positions.

3. A drill having a body, said body having therein a cutter recess, a pair of block recesses at the opposite ends of said cutter recess and flanges projecting laterally from opposite sides of said block recesses, said flanges having grooves therein; a block in each of said block recesses; a roller cutter in said cutter recess; a cutter pin in said blocks and cutter; the ends of said cutter pin being longitudinally split; and tapered locking pins movable through the grooves in said flanges, through said blocks, and through the ends of said cutter pin to spread the ends of said cutter pin into locking engagement with said blocks.

4. A drill having a body, said body having therein a cutter recess and a pair of block recesses at the opposite ends of said cutter recess; a block in each of said block recesses; a roller cutter in said cutter recess; a cutter pin in said blocks and cutter; the ends of said cutter pin being longitudinally split; and tapered locking pins movable transversely through said blocks and the ends of said cutter pin to spread the ends of said cutter pin into locking engagement with said blocks.

5. A drill having a body, said body having therein a cutter recess and a block recess; a block in said block recess; a roller cutter in said cutter recess; a cutter pin in said block and cutter, said cutter pin being split; and a tapered locking pin movable transversely through said block and said cutter pin to spread said cutter pin into locking engagement with said block.

GEORGE G. HARRINGTON.
DANIEL L. DEL HOMME.